H. C. MILLER.

TONE ARM MOUNTING FOR SOUND REPRODUCING MACHINES.

APPLICATION FILED OCT. 20, 1915.

Reissued May 22, 1917. 14,305.

INVENTOR

Henry C. Miller.

WITNESS

F. J. Hartman.

John D. Myers.

BY Fritz & Blount.

ATTORNEYS

UNITED STATES PATENT OFFICE.

HENRY C. MILLER, OF WATERFORD, NEW YORK, ASSIGNOR TO VICTOR TALKING MACHINE COMPANY, OF CAMDEN, NEW JERSEY, A CORPORATION OF NEW JERSEY.

TONE-ARM MOUNTING FOR SOUND-REPRODUCING MACHINES.

14,305. Specification of Reissued Letters Patent. Reissued May 22, 1917.

Original No. 1,076,385, dated October 21, 1913, Serial No. 321,014. Original reissue No. 14,257, dated February 6, 1917, Serial No. 57,003. Application for this reissue filed October 20, 1915. Serial No. 57,004.

DIVISION B.

*To all whom it may concern:*

Be it known that I, HENRY C. MILLER, a citizen of the United States, residing at Waterford, in the county of Saratoga and State of New York, have invented certain new and useful Improvements in Tone-Arm Mountings for Sound-Reproducing Machines, of which the following is a specification.

This invention relates to talking machines, and particularly to an improved coupling or mounting for the swinging sound conveyer or tone arm, the application being a division of the parent application filed of even date herewith, for the reissue of Letters Patent No. 1,076,385, granted to me on October 21, 1913, for an improvement in automatic stopping devices for sound-reproducing machines.

The invention consists specifically in the combination with a talking machine including a sound conveyer or tone arm adapted to carry the sound box across the record support, as is usual, of a mounting for said tone arm comprising a hollow support with which one end of said tone arm communicates, a pivot carried by one of said communicating parts, and a bearing carried by the other of said communicating parts, and adapted to turn on the pivot to permit the tone arm to swing across the record support about a substantially vertical axis, the bearing and the pivot being entirely inclosed within the tone arm and support, and being freely separable by lifting the tone arm in the direction of said pivot whereby to permit the tone arm to be readily removed from its hollow support, when desired.

The invention further consists in pivoting to the tone arm the coupling element carried thereby in order to permit the tone arm to turn on said element about a horizontal axis to move toward and away from the record support and thereby have universal movement.

Figure 1:
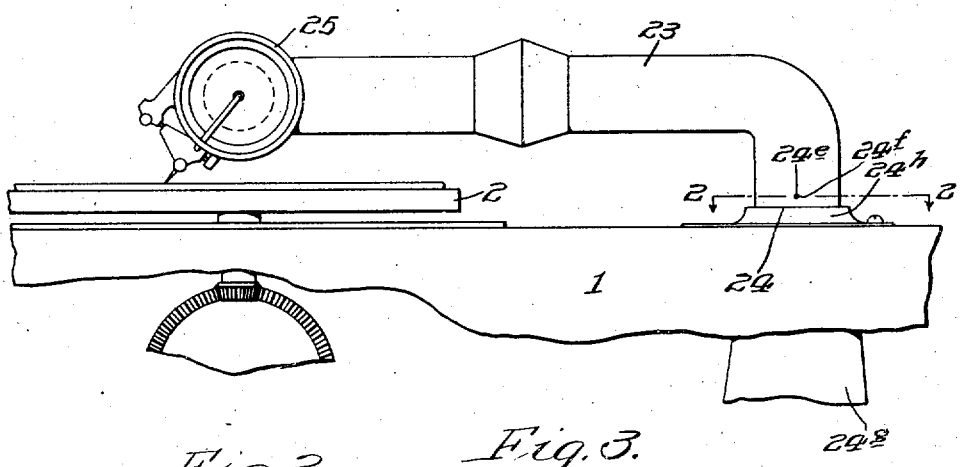
Figure 2:
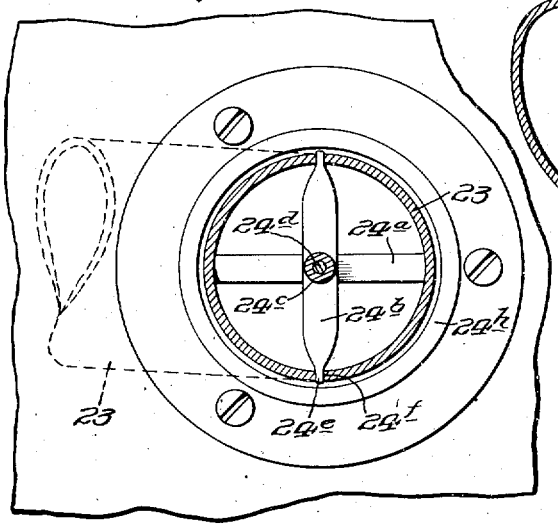
Figure 3:
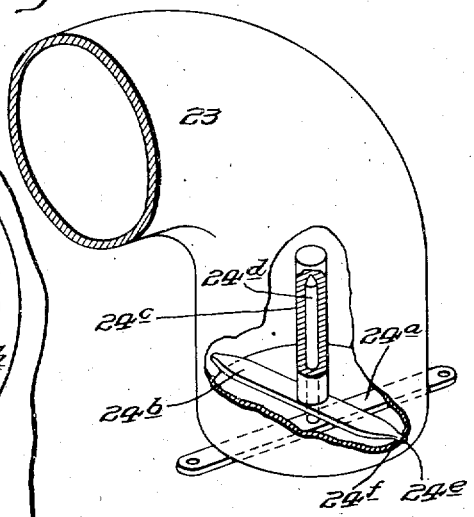

In the accompanying drawing, Figure 1 is a fragmentary side elevation, showing my invention applied to a talking machine; Fig. 2 is an enlarged horizontal section on the line 2—2 of Fig. 1, and Fig. 3 is a detail perspective view, partially broken away, illustrating the parts of the coupling in operative relation to the tone arm.

Referring to the drawing, the invention consists of a hollow sound conveyer or tone arm 23, which is provided at one end with a mounting or coupling 24, and which carries at its opposite end a sound box 25, the coupling permitting the tone arm to swing horizontally to carry the sound box across the turntable or record support 2 of a talking machine 1 of the disk type, the talking machine being only partially illustrated, as it is of the usual or any desired form, except for the parts herein specifically described. The tone arm has its end remote from the sound box turned downwardly and substantially perpendicularly to the major portion of the tone arm, and this downturned end is in coöperative relation to and communicates with the upwardly opening end of a hollow support $24^h$, this support being secured to or provided by the upper portion of the casing of the talking machine, and communicating with an amplifier $24^g$, which in the specific embodiment of the invention illustrated in the drawing, is of the inclosed type, and is located within the casing of the talking machine.

The means for coupling the downturned end of the conveyer to the hollow support consists essentially of a pivot post $24^d$ carried by one of said parts, and a bearing $24^e$ carried by the other of said parts, and adapted to telescope with the pivot post and to have turning movement relatively thereto. In the present instance the pivot post is carried by the hollow support, although it is to be understood that it is not necessarily so mounted, and is disposed coaxially within the hollow support $24^h$, and extends vertically upwardly beyond the upper end of said support.

As the preferred means for supporting the pivot post, I have shown a support or bar $24^a$ which extends across the hollow support $24^h$, and is secured at its ends thereto or to an adjacent fixed part of the talking machine.

The bearing $24^e$ is carried by a support or bar $24^b$, which extends across the downturned end of the tone arm 23. At its lower end the bearing is open in order to permit it to fit over and telescope with the pivot post $24^d$, the bearing being adapted to turn on the pivot post and thus permit the tone arm 23 to swing horizontally on a vertical axis to cause the sound box 25 to traverse a record on the turntable 2. The ends of the support $24^b$ are reduced to form journals $24^e$ having bearings at $24^f$ on opposite sides of the tone arm. This arrangement permits the tone arm to turn on said journals about a horizontal axis to enable the sound box to be moved toward or away from the record support, as may be desired to bring the stylus into or out of operative engagement with a record.

By means of this invention a coupling is provided which is very simple and efficient, and which may be readily separated, when desired, by merely lifting the tone arm to withdraw the bearing from the pivot post. It is also to be noted that the pivot post and bearing, as well as the support therefor, are wholly inclosed by the tone arm and the hollow support $24^h$ in the operative position of the parts, and hence the coupling is entirely out of the way and is protected from accidental injury through contact.

What I claim is:—

1. In a sound reproducing machine, the combination with a sound conveyer having a sound box attached to one end, and a coupling at the opposite end of the sound conveyer, said coupling comprising a support provided with a pivot, and a bearing fitting freely over the pivot and pivoted to the sound conveyer, and an amplifier communicating with the sound conveyer, whereby said conveyer and pivoted bearing may be freely removed from said pivot and support and amplifier.

2. In a talking machine, a sound conduit comprising two members, a hollow support having an upwardly disposed open end, forming one of said members, a tone arm having a downwardly disposed open end cooperating with the open end of said support, forming the other of said members, and a pivot carried by one of said members and rotatively connecting said tone arm to said support, said arm being freely removable from said support.

3. In a talking machine, a sound conduit comprising two members, a hollow support having an upwardly disposed open end, forming one of said members, a tone arm having a downwardly disposed end in cooperative relation with the upwardly disposed end of said support, forming the other of said members, and a pivot carried by one of said members and rotatively connecting the same and wholly inclosed by said tone arm and said support, said tone arm being freely removable from said support.

4. The combination with a hollow support having an upwardly disposed open end, of a tone arm having a downwardly disposed end in coöperative relation with said upwardly disposed end, and a pivot carried by said hollow support and rotatively connecting and wholly inclosed by said tone arm and said support, said tone arm being freely removable.

5. The combination with a hollow support having an upwardly disposed open end, of a tone arm having a downwardly disposed end in coöperative relation with said upwardly disposed end, and a pivotal connection to permit vertical and horizontal swinging movement of the tone arm, located at said ends of and entirely inclosed by the hollow support and tone arm, said tone arm being freely removable.

In testimony whereof I have signed my name to this specification.

HENRY C. MILLER.